United States Patent [19]

Bowman et al.

[11] Patent Number: 4,891,746
[45] Date of Patent: Jan. 2, 1990

[54] METHOD OF OPTIMIZING THE EFFICIENCY OF A HIGH FREQUENCY ZERO VOLTAGE SWITCHING RESONANT POWER INVERTER FOR EXTENDED LINE AND LOAD RANGE

[75] Inventors: Wayne C. Bowman; William A. Nitz, both of Rockaway; Norman G. Ziesse, Chester, all of N.J.

[73] Assignee: American Telephone and Telegraph Company, AT&T Bell Laboratories, Murray Hill, N.J.

[21] Appl. No.: 280,075

[22] Filed: Dec. 5, 1988

[51] Int. Cl.$^4$ ............................................. H02M 7/537
[52] U.S. Cl. ........................................ 363/131; 363/16; 363/21; 363/97
[58] Field of Search ................... 363/16, 21, 40, 97, 363/126, 131

[56] References Cited

U.S. PATENT DOCUMENTS

| | | | |
|---|---|---|---|
| 4,441,117 | 4/1984 | Zommer | 357/43 |
| 4,449,174 | 5/1984 | Ziesse | 363/40 |
| 4,449,175 | 5/1984 | Ishii et al. | 363/17 |
| 4,605,999 | 8/1986 | Bowman et al. | 363/19 |
| 4,607,323 | 8/1986 | Sokal | 363/21 |
| 4,685,041 | 8/1987 | Bowman et al. | 363/40 |
| 4,727,308 | 2/1988 | Huljack et al. | 323/222 |
| 4,788,634 | 11/1988 | Schlecht et al. | 363/21 |

Primary Examiner—William H. Beha, Jr.
Attorney, Agent, or Firm—A. G. Steinmetz

[57] ABSTRACT

A power inverter efficiency is optimized at high frequency in a fully resonant inverter operating with a range of load impedance that takes into consideration switching loss and conducting loss as a combined overall effect. Within this range of load impedance the inverter is constrained to operate with switching loss which is generally considered unacceptable in a conventional high frequency high efficiency power inverter, but the overall combined high efficiency of the disclosed power inverter has a wider range of load impedances than has been previously achieved in such a resonant power inverter. Non-linear capacitance across switching the device is positively utilized in achieving this goal.

5 Claims, 6 Drawing Sheets

TOTAL INVERTER LOSS
LINEAR vs NONLINEAR CAPACITORS

METHOD OF OPTIMIZING THE EFFICIENCY OF A HIGH FREQUENCY ZERO VOLTAGE SWITCHING RESONANT POWER INVERTER FOR EXTENDED LINE AND LOAD RANGE

FIELD OF THE INVENTION

This invention relates to fully resonant type inverters and DC-to-DC converters and in particular to the efficiency and useful range of line and load of these inverters and converters operated at high switching frequencies.

BACKGROUND OF THE INVENTION

In principle, switched-mode power converters function by alternately connecting and disconnecting the source to the load by means of an active switch. Therefore, in order to deliver continuous power to the load, some means of intermediate energy storage must be included within the converter to provide power during the interval when the source is disconnected. Since the amount of energy delivered to the load by these elements is proportional to the length of the conducting portion of the switching interval, increasing the operating frequency of the converter (i.e. reducing the length of the conducting and switching intervals) also reduces the amount of internal energy storage required. Since the size and weight of switched-mode power converters is most often dominated by these internal energy storage elements, increasing the operating frequency of switched-mode converters is often employed as a technique to reduce their size. However, as the operating frequency of these converters is increased, frequency related losses also increase, ultimately limiting the maximum practical operating frequency.

At low operating frequencies, power dissipation in the active switch(es) of a conventional switched-mode power converter are primarily dominated by conduction losses. However, as the operating frequency of the power switch(es) is increased another type of power loss, commonly called switching loss, begins to constitute a significant portion of the total power loss in the switch(es). Switching losses result from dissipation of energy due to the simultaneous occurrence of voltage across and current through a switch during its switching transitions. Since a finite amount of energy is lost during each switch transition due to this overlap, the power dissipated in the switch(es) of a switched-mode power converter is proportional to its operating frequency. This makes reduction of switching loss a key factor in the improvement of the operating efficiency of switched-mode inverters and DC-to-DC converters operating at high frequencies.

This switching loss reduction is achievable through the use of quasi or fully resonant inverters and converters which employ a controlled waveform switching operation that reduces or eliminates the simultaneous occurrence of voltage across and current through the power switch(es) during switching transitions. An illustrative example of a quasi resonant converter is disclosed in U.S. Pat. No. 4,415,959 and an illustrative example of a fully resonant converter is disclosed in U.S. Pat. no. 4,607,323.

Previous investigators have concentrated primarily on circuit design techniques which reduce or eliminate switching losses by control of the waveforms applied to the power switch. The inverter circuit of the fully resonant converter relies on the shaping of the voltage waveform across the power switching device to achieve the low switching loss that permits operation at high frequencies. One of these approaches, [U.S. Pat. No. 4,607,323], which applies Class-E amplifier techniques to a DC-to-DC converter to produce a zero-voltage-switching converter has relied heavily on the use of a shunt diode in parallel with the power switch or the body diode of the semiconductor power switch. This diode which shunts the main conduction path of that switch is properly oriented or polarized in order to prevent negative or reverse current flow through the power switch by clamping negative going voltages. This diode acts to provide a significant region of effective load impedance on the inverter section over which there is zero switching loss and increases the range of load on the entire converter over which operation of the power switch without switching loss can be maintained.

Elimination of switching losses in the zero-voltage-switching DC-to-DC converter is achieved according to U.S. Pat. No. 4,607,323, by designing a load network including the rectifier circuit that properly loads the inverter circuit with a range of impedances that achieve the desired switching waveform control. Hence the power switching devices are operated with substantially zero switching loss. Proper wave shaping across the power switch occurs only over a relatively narrow range of inverter load impedance. As the resistive component of this load impedance is decreased switching losses generally decline at the expense of increased conduction losses. Conversely, as the resistive component of this load impedance is increased switching losses generally increase quickly even though conduction losses are declining. The power switch in this example is shunted by a diode. Recognition of the operative effect of this diode in parallel with the power switch permits the converter to operate over a wider range of input voltage and output power without switching loss or with very low switching loss. Conduction loss in the power switch(es) was assumed to be negligible in this U.S. Pat. No. 4,607,323.

The design techniques disclosed in U.S. Pat. No. 4,607,323, are concerned solely with elimination of switching losses in the main power switch. At sufficiently low frequencies where conduction losses are readily kept low this approach has merit. However, at high frequencies this approach generally suffers from excessive conduction losses. Unfortunately, the shunt diode provides zero switching loss at the low end of the load resistance range where conduction losses are largest. In particular, switching loss is eliminated with these techniques by operating the inverter into a load impedance with a resistive component low enough to ensure conduction of the diode in shunt with the active power switch over the operating line and load range of the converter. However, this elimination of switching losses is achieved as indicated above at the expense of increased conduction losses in the converter since operation of this inverter with low resistive loads increases currents in the circuit, thereby increasing the conduction losses.

Conduction loss in the switching device was assumed to be negligible in the zero-voltage-switching power converters of the prior art which have been optimized to reduce only switching loss. However, in a practical zero-voltage-switching power converter, realistic power switching devices do not have negligible conduction losses particularly at high frequencies where the size of a suitable power switch is limited by its parasitic capacitance. To be useful in a practical high frequency power converter, the total loss in the inverter must be minimized, including both switching losses and conduction losses, and must remain low over the wide line and load range commonly encountered in the normal operation of such a converter.

Parasitic capacitances that are normally part of a switching device in a high frequency power converter tend to increase switching losses by discharging in each switching cycle. Hence operation of the converter must be carefully controlled to achieve zero voltage switching and thereby to minimize these switching losses. This requires consideration of the effect of the parasitic capacitance on circuit operation. In addition, switching device resistance causes a resistive power loss within the switching device. These two characteristics namely capacitance and resistance of the semiconductor switching device (particularly a MOSFET device) are each dependent on its physical size. Increasing the size of the semiconductor switching device increases its capacitance and decreases device resistance. Capacitance can be reduced by reducing device size but this also increases device resistance. Hence a desire to lower switching losses by reducing the switching device size to reduce parasitic capacitances also increases conduction losses. This situation is further complicated in zero-voltage-switching resonant converters where, the parasitic capacitance of the semiconductor switching device is an integral part of the resonant circuit making the value of this capacitance important for proper circuit operation.

From the above discussion it should be clear that conduction losses and switching losses in the semiconductor switching device are interrelated and that proper selection of the device as well as choosing the proper operating region for the inverter are both necessary in order to minimize the total loss in the power switch(es) of a practical switched-mode power converter.

SUMMARY OF THE INVENTION

A zero voltage-switching fully resonant inverter or dc-dc converter embodying the principles of the invention, which has a capacitor connected in parallel with the power switch, operates with a significant improvement in power conversion efficiency over a wide range of input voltage and output power by utilizing a non-linear capacitor connected in parallel with the power switch. This non-linear capacitor has an operating characteristic in which the capacitance of the capacitor increases with decreasing voltage across the capacitor terminals. It serves to broaden the inverter section load impedance range within which the switching losses incurred are low. At high frequencies where conduction loss in components of the inverter tend to be high, the nonlinear capacitance greatly facilitates minimizing the sum of combined switching and conduction losses. Exemplary power circuits to which the principles of the invention may be applied are disclosed in U.S. Pat. Nos. 4,685,041; 4,605,999 and 4,449,174.

Minimization of the total combined losses due to switching and conductive loss requires operation with a higher load resistance on the inverter section than is the case with minimizing switching loss alone. Accordingly the inverter portion of the converter is operated into a higher AC load resistance (e.g. the load network seen by the inverter) and the switching loss is minimized by action of the nonlinear capacitance in shaping the voltage waveform across the power switch. Hence by considering the combined effects of both switching loss and conduction loss switching loss is actually incurred in order to minimize total loss.

The inerter circuit of the fully resonant converter relies on the shaping of the voltage waveform across the switching device to achieve the low switching loss that permits operation at high frequencies. Proper wave shaping occurs over a wider range of inverter section load impedance than was obtainable in the prior art. As the resistive component of this impedance is decreased switching losses generally decline at the expense of increased conduction losses. Conversely, as the resistive component of this impedance is increased switching losses generally increase quickly even though conduction losses are declining. There is, therefore, a minimum in total loss where neither conduction or switching losses dominate.

In a converter operating with a power MOSFET switch at high frequencies, the internal capacitances of the MOSFET device may be sufficient to satisfy the requirement for a capacitor across the switch in the fully resonant, zero-voltage switching circuit approach discussed here. The effective internal capacitance of such a MOSFET is, in fact, nonlinear, and possesses the correct properties to enhance circuit performance to achieve high efficiency operation. By utilizing a nonlinear capacitance across the power switch the locus of operating points of the inverter in the load space can be shifted to substantially reduce conduction loss without significantly increasing switching loss (i.e. conduction loss declines at a faster rate than switching loss increases). This nonlinear capacitance has the further advantage of significantly reducing the sensitivity of inverter losses to input voltage and load and to the power switch duty ratio. Power MOSFET devices are desirable for use as power switches in high frequency inverters and DC-to-DC converters because of their desirable drive characteristics. With proper MOSFET device size and operation frequency, the nonlinear capacitance of the MOSFET device is sufficient by itself to attain these operational advantages.

DETAILED DESCRIPTION

Figure 1:
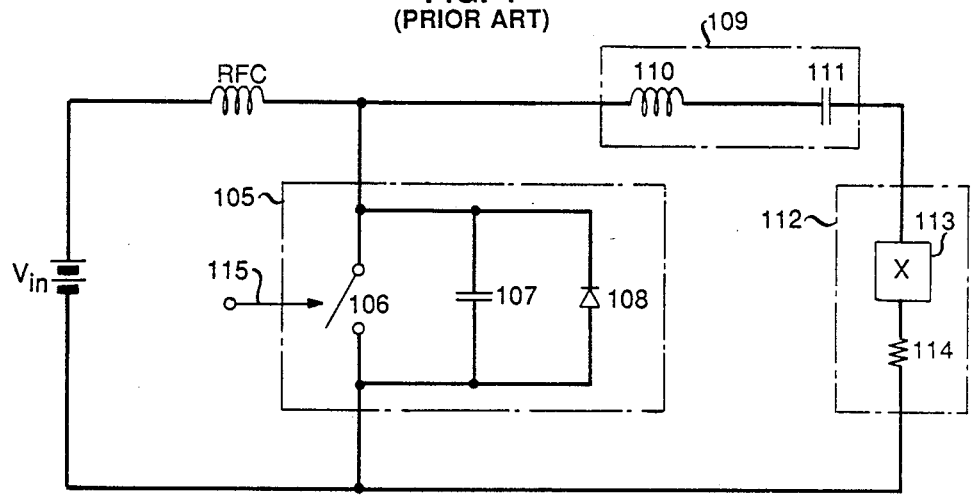
FIG. 1 is a schematic of a resonant power inverter known in the prior art with a linear capacitance in parallel with the power switch.

A fully resonant zero-voltage-switching power inverter as known in the prior art is shown in FIG. 1 in which a series network 109 and a load network 112 are co-operative to shape substantially continuous periodic waveforms across the power switch. The series network 109 includes a series connected inductor 110 and a capacitor 111 and the load network 112 includes a reactive impedance 113 and an actual resistive load 114. With proper component values the series network 109 and load network 112 contstrains the current waveform and voltage waveform of a power switch 106 of the inverter to be substantially non simultaneous. This inverter is intended to operate primarily in a region with no switching loss and its operation is based principally on the class E amplifier principles. A diode 108 has been added to the class E amplifier in order to create a region of load impedance that permits switching of the power switch 106 with zero switching loss. A periodic drive is applied to the power switch at switch drive terminal 115.

Figure 4:
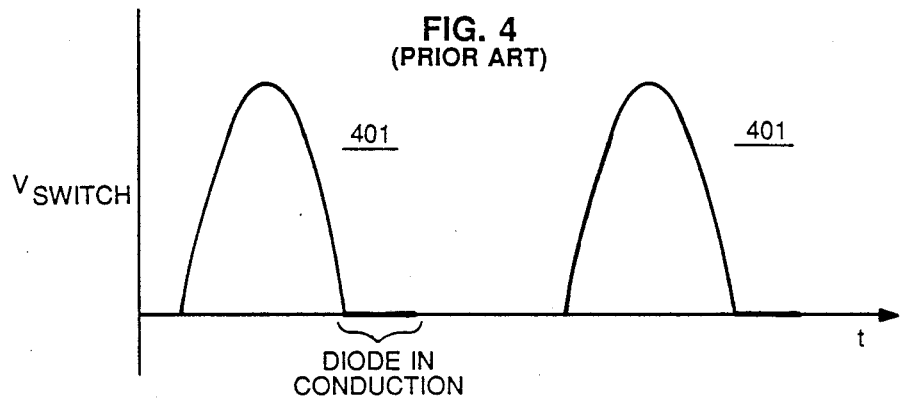
FIG. 4 is a graph of the voltage waveform across the power switch in the inverter of FIG. 1.

The waveform of voltage periodically appearing across the power switch of the inverter of FIG. 1 is shown in FIG. 4 and as shown the voltage waveform 401 initially rises sharply and smoothly from zero to a peak value and then drops to zero. It is prevented from dropping below zero or going negative by the clamping action of a diode 108 shunting the power switch 106. This clamping action has been credited by previous investigators for permitting a fully resonant inverter to operate with zero switching loss within a limited region of the normal load variations that the power inverter must accomodate when used in a DC-DC converter. However the concern of these investigators has been solely with switching loss elimination and ignores other contributory factors to loss of efficiency in the operation of a fully resonant converter, particularly one operated at very high frequency in order to reduce physical size of the converter.

Conduction loss in addition to switching loss occurs due to resistance in the power switch 106 and the power switching circuitry 105 and other circuit components including the series network 109 and the load network 112. At high frequencies conduction losses tend to be high in the zero switching loss region in which this inverter is designed to operate. At high frequency, for example, the size of a MOSFET power switch cannot be arbitrarily increased to reduce conduction loss.

Figure 6:
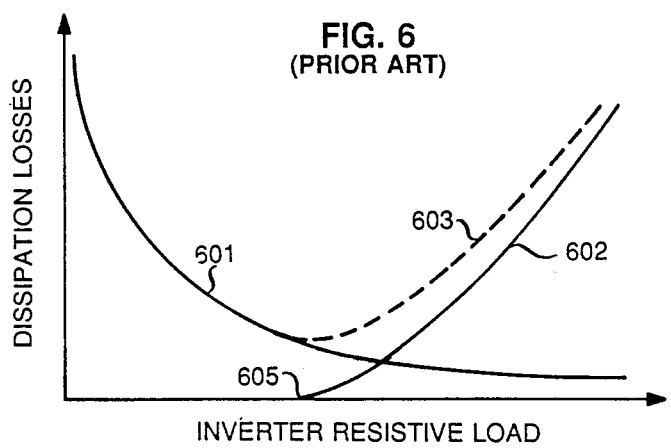
FIG. 6 is a graph of the power dissipation attributes of the resonant power inverter of FIG. 1.

An exposition of the individual power dissipating factors contributing to the losses of the inverter of FIG. 1 is shown in graphic form in FIG. 6 which individually depicts the switching loss characteristics of power switch and the conduction loss characteristics of the inverter and the sum total of the two. As is apparent the switching loss, as shown by switching loss curve 602, is zero at low loads and after the load reaches a resistive threshold at point 605, where the diode 108 ceases to clamp, it increases rapidly as the load increases. Conduction loss, as shown by conduction loss curve 601, is very high when the inverter is loaded with a low load resistance and decreases rapidly as the load resistance increases. The dotted line representing the total loss curve 603 shows total losses in the inverter circuit of FIG. 1 once the switching losses have become significant. The practical minimum loss region of operation exists for only a very samll range of load resistance.

Figure 2:
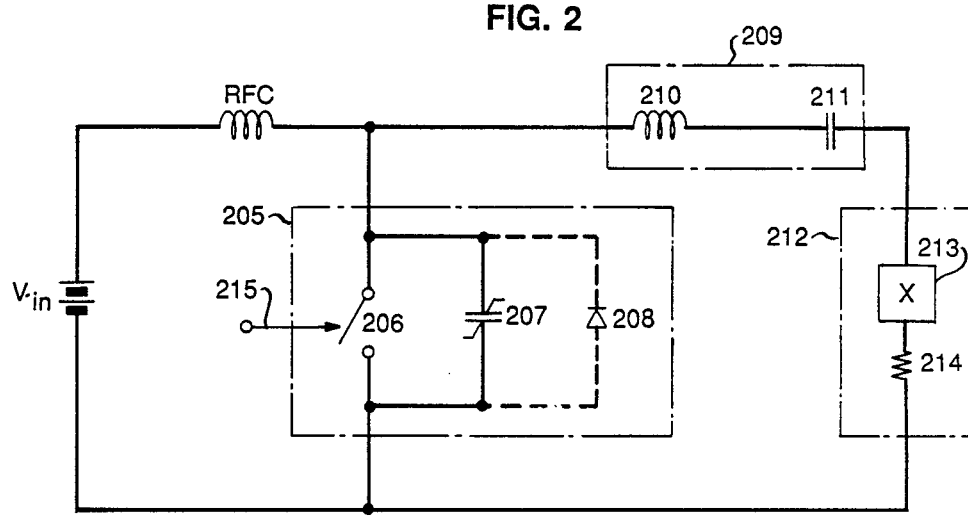
FIG. 2 is a schematic of a resonant power inverter with a nonlinear capacitance in parallel with the power switch.

An inverter operating in a fully resonant mode such as is discussed in U.S. Pat. Nos. 4,449,174; 4,605,999 and 4,685,041 but with a non linear capacitor 207 connected in parallel with the power switch 206 as is shown in FIG. 2. The voltage-capacitance characteristic of the non-linear capacitor 207 is shown by curve 301 in the graph of FIG. 3. It is important to theoperation of this inverter according to the invention that the capacitance of the non linear capacitor rise rapidly with decreasing voltage across its terminals at low voltage levels. A diode 208 is shown in dotted form shunting the power switch 206. This diode 208 is not used and is not necessary for clamping according to the invention. It may in some circumstances provide a junction capacitance which provides part or all of the desired non linear capacitance.

A periodic drive signal is applied to the switch drive terminal 215 to drive the power switch 206. The output of the power switch 206 is coupled to a series connected series network 209 and load network 212. The series network 209 comprises a series connected inductor 210 and capacitor 211. The load network 212 includes a resistive load 214 and a reactance impedance 213. This load network 212 may comprise a resonant rectifier connected to a load such as is discussed in U.S. Pat. No. 4,685,041. The series and load networks 209 and 212 are identical to those shown in FIG. 1 and operate in the same manner to shape a substantially continuous periodic waveform across the power switch 206. The resistive impedance of the load network 212 is specified as large as possible in order to lower overall conduction loss in the inverter and still maintain control over the switching loss. The use of the non linear capacitor 207 allows operation of the inverter in a region having a load impedance range where conduction losses are substantially lower than would be normally incurred in a region in which the shunt diode 108 in the circuit of FIG. 1 conducts. Although a small switching loss is incurred, total loss is minimized. Furthermore, the non-linear capacitor 207 serves to maintain reasonable total losses over a significantly broad range of load resistance.

Figure 5:
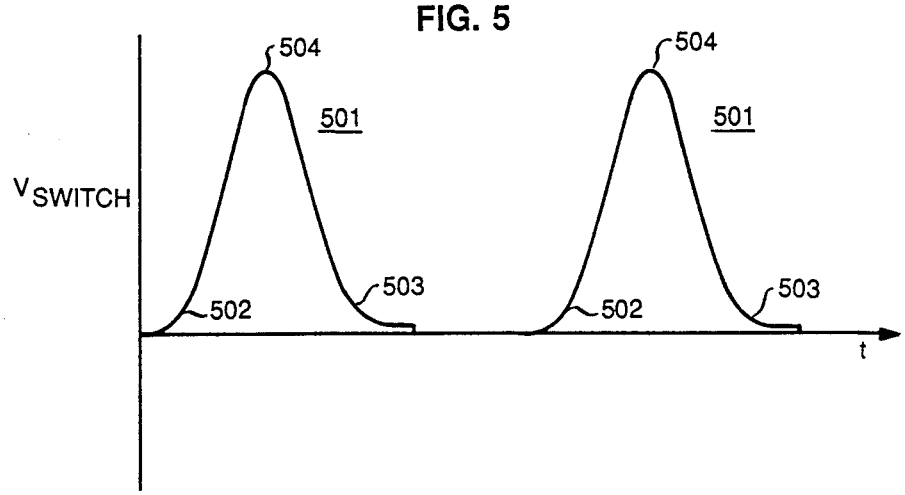
FIG. 5 is a graph of the voltage waveform across the power switch in the inverter of FIG. 2.

The effect of the non-linear capacitance on the operation of the power switch may be seen by comparing the change in the voltage waveform across the power switch. This voltage waveform, shown in FIG. 5, has a different profile from the waveform of FIG. 4 depicting the effect of replacing a linear capacitor 107 connected in shunt with the power switch 106, as shown in FIG. 1, with a nonlinear capacitor 207 connected in shunt with the power switch 206, as shown in FIG. 2. The voltage waveform across the power switch 106 of the inverter of FIG. 1 is periodically terminated by the clamping action of the shunt diode 108 which prevents negative voltage across the power switch 106. There is no clamping action applied by the diode 208 to the power switch 206 in the circuit of FIG. 2.

Figure 3:
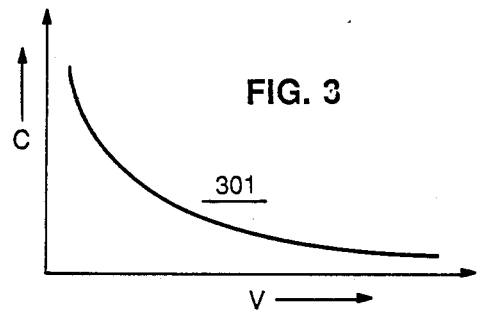
FIG. 3 is a graph of the capacitance of the nonlinear capacitor included in the circuit shown in FIG. 2.

The voltage waveform 501 in IFG. 5 associated with the non linear capacitor 207 connected in parallel with the power switch 206 has a different profile than the voltage waveform 401 in FIG. 4. The voltage waveform 501 has a more sharply defined peak portion 504 and a more gradual initial ascent 502 and a more gradual dinal descent 503 at the beginning and end of the non conduction cycle of power switch 206, respectively. This waveform 501 has no tendency to go negative and hence the diode 208 shunting the power switch 206 is not necessary. It normally exists in practical power MOSFET devices as an inherent attribute of the power switch 206 but it does not normally conduct in inverter circuits devised according to the invention. Due to the differing non linear capacitance voltage characteristic of the nonlinear capacitor 207, as shown in FIG. 3, the capacitance is increased significantly at low voltage levels as the voltage drops and vise versa.

Figure 8:
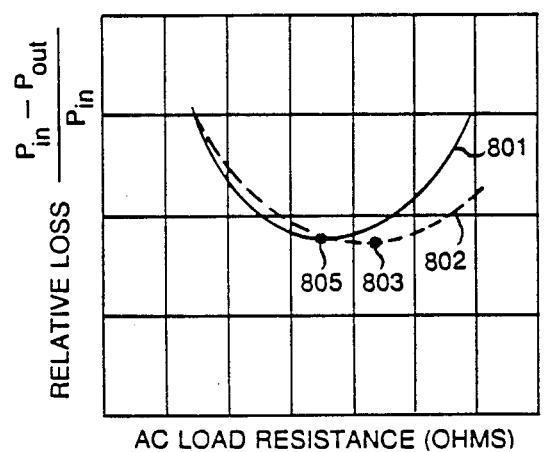
FIG. 8 is a graph comparing the operating efficiencies of the resonant inverters of FIG. 1 and FIG. 2.

The difference in the loss profile between an inverter having a linear capacitor shunting the power switch and one substantially equivalent to it having similar resistive components and operating at identical input voltage and output power conditions except for having a nonlinear capacitor shunting the power switch and operating in accord with the invention is shown in the graph of FIG.8. FIG. 8 discloses two curves 801 and 802 which show the overall efficiency of the inverters of FIG. 1 and FIG. 2 respectively. The minima range of the efficiency curve 801 for the inverter of FIG. 1 having a linear capacitor 107 shunting the power switch 106 is less than the minima range of the efficiency curve 802 for the inverter of FIG. 2 having a nonlinear capacitor 207 shunting the power switch 206. The curve of efficiency 802 for the inverter having the non linear capacitor 207 also has a smaller increasing slope beyond the minimum point 803 as the load increases reflecting a more gradual increase in switching loss than does the curve 801 beyond its minimum point 805.

Figure 7:
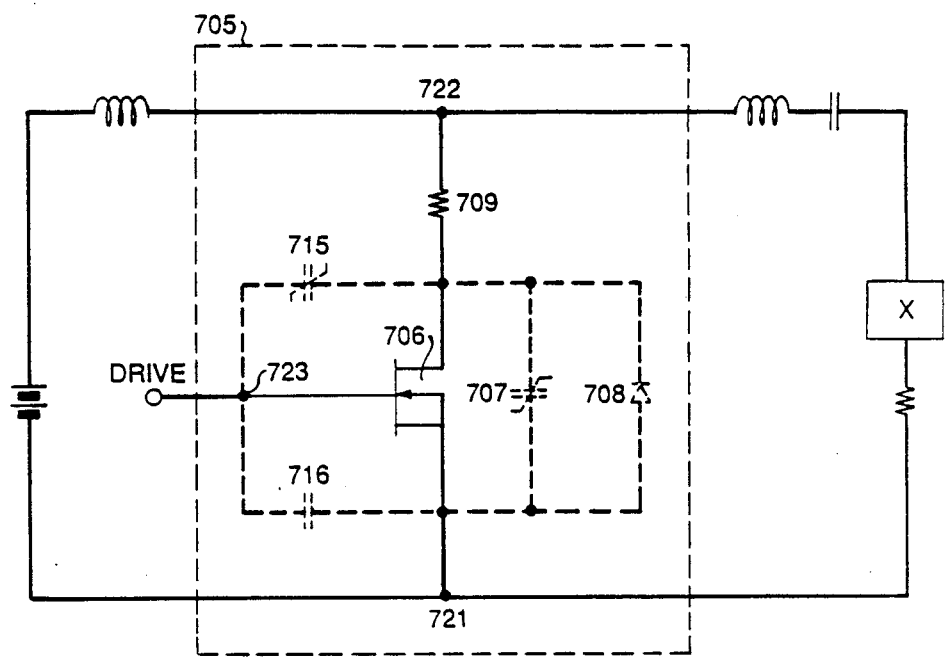
FIG. 7 is a schematic of a resonant power inverter using a FET device for the power switch.

A suitable device for a power switch in an inverter circuit incorporating the invention may be embodied in MOSFET technology as shown in FIG. 7. An inverter circuit is shown as having a MOSFET power switch 706, in which a nonlinear shunt capacitance 707 is an inherent characteristic of the MOSFET power device 705. This nonlinear capacitance 707 is utilized to improve overall efficiency of the inverter over a wide range of load. This MOSFET power switch 706 is driven with a periodic signal applied to the gate terminal 723. The power switching circuitry with its characteristic or inherent impedances is embodied in a power MOSFET device 705. The power MOSFET device 705 typically has many inherent diode junction, body impedances and reactive components including a nonlinear capacitance 707 shunted in parallel with the drain-source power conduction path 722-721. The value of this capacitance 707 is determined by the physical size of the power MOSFET device 705. A resistive impedance 709 is shown in series with the drain-source power conduction path 722-721. This resistive impedance 709 is also determined by the physical size of the power MOSFET device 705. A body diode 708 is also inherently included in shunt with the drain-source power conduction path 722-721 but its clamping action is not used. A nonlinear capacitance 715 couples the drain to the gate 723 of the MOSFET device and a relatively linear capacitance 716 couples the source 721 to the gate 723 of the MOSFET device. An input to the gate terminal 723 is provided to accept a drive signal to periodically drive the power MOSFET device 705.

This inverter circuit of FIG. 7 is operated at a sufficiently high frequency to allow the internal inherent nonlinear capacitor 707 in shunt with the main power path between the drain terminal 722 and the source terminal 723 supply the entire non linear capacitance needed across the power switch to enable the inverter to operate in a region in which the sum of switching loss and conduction loss is minimized.

Figure 9:
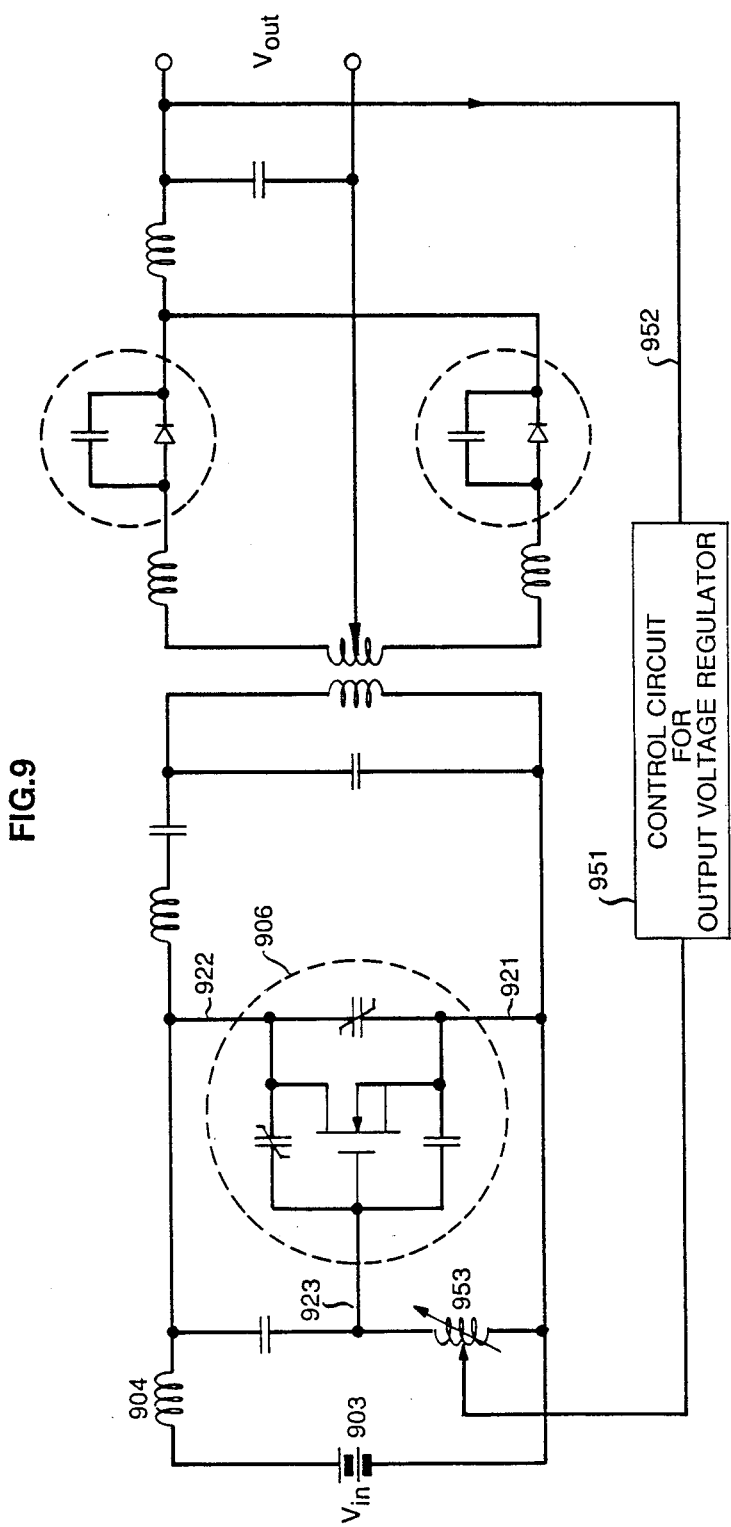
FIG. 9 is a schematic of a current fed self oscillating resonant converter embodying the principles of the invention.

An example of a DC-DC converter circuit embodying the principles of the invention is shown in FIG. 9. THis converter includes an inverter circuit which is current fed from an input voltage source 903 via inductor 904 connected in series between voltage source 903 and the MOSFET power switch 906. This converter includes a feed back path from the drain terminal 922 of the MOSFET power switch 906 to its gate terminal 923 to enable the inverter circuit to self oscillate. A controllable inductive reactance 953 is included between the source terminal 921 and gate terminal 923 and is varied in inductance in response to a voltage regulating control circuit 951. The voltage regulating control circuit 951 monitors the output voltage via lead 952 and varies the effective inductance of reactance 953 to vary the frequency of self oscillation and hence regulate the output voltage. Voltage regulation of a self oscillating resonant converter by varying its frequency of oscillation is discussed in prior U.S. Pat. No. 4,685,041 and hence is not discussed herein. The output of the inverter is applied to a full wave resonant rectifier which is disclosed and discussed in prior U.S. Pat. No. 4,605,999.

Figure 10:
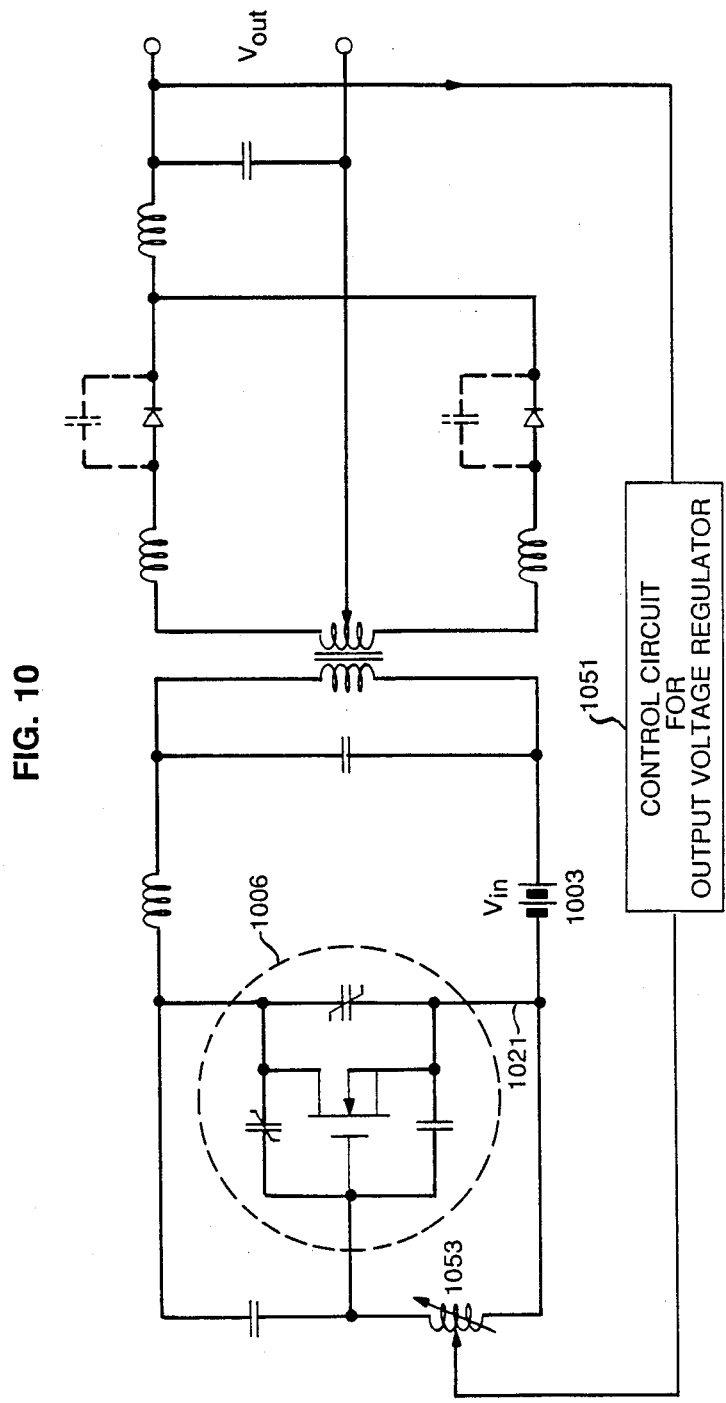
FIG. 10 is a schematic of a voltage fed self oscillating resonant converter embodying the principles of the invention.

A DC-DC converter including a voltage fed inverter is shown in FIG. 10 and includes a voltage source 1003 connected to the source terminal 1021 of the MOSFET power switch 1006. A feedback path including controllable inductive reactance 1053 enables the inverter to self oscillate and the inductance of the ractance 1053 is varied in response to the voltage regulating control circuit 1051 to vary oscillating frequency and hence regulate the output voltage.

We claim:

1. A method of optimizing efficiency of a high frequency zero voltage switching resonant converter having a power switching device operating into an effective load comprising an inductive reactive component; comprising the steps of:
  utilizing a non-linear capacitance shunting the power switching device to reduce overall power dissipation by;
  determining a switching loss characteristic of the power switch;
  determining a conduction loss characteristic of the high frequency converter circuit including conduction loss in the power switch;
  determining a set of component values defining an operating point for the high frequency converter that minimizes a sum of combined losses related to switching loss conduction loss and switching the power switching device at a frequency to achieve a high overall operating efficiency for the converter.

2. A method of optimizing efficiency of a high frequency zero voltage switching resonant converter as claimed in claim 1;
  further comprising the step of:
  utilizing a non-linear capacitance having a characteristic in which capacitance increases with decreasing voltage across the power switching device.

3. A method of optimizing efficiency of a high frequency zero voltage switching resonant converter as claimed in claim 2;
  further comprising the step of:
  operating an inverter portion of the high frequency converter into an effective reactive load whose resistive component exceeds the resistive component necessary for solely optimizing a reduction of switching loss of the power switching device.

4. A method of enhancing overall efficiency of a high frequency fully resonant power converter in which a power switching device is operated into a series reactive load having an inductive impedance;
comprising the steps of:
utilizing a non linear capacitance with a capacitance characteristic in which capacitance increases as voltage decreases and which is connected in shunt with the power switch and is operative for shaping a voltage waveform across the power switch with a sharply defined peak region bounded by a gradual ascent and gradual descent in shape of the waveform and thereby broadening an impedance range into which the power switch can operate without incurring excessive switching losses;
determining an overall loss profile curve for the power converter by combining switching loss and conduction loss characteristics for the power converter; and
determining component values for the power converter that define an operating point of the power converter on the overall loss profile curve to minimize a sum of losses due to switching loss and conduction loss.

5. A method of enhancing overall efficiency of a high frequency fully resonant power converter in which a power switching device is operated into a series reactive load having an inductive impedance, as claimed in claim 4; and
further comprising the steps of:
utilizing as the power switch a power MOSFET device with inherent non-linear shunt junction capacitance and operating the power converter at a frequency whereby the junction capacitance is operative for shaping the voltage waveform across the power switch with a sharply defined peak region bounded by a gradual ascent and gradual descent in shape of the waveform.

* * * * *